United States Patent
Wharry et al.

(10) Patent No.: US 11,988,607 B2
(45) Date of Patent: May 21, 2024

(54) CHEMILUMINESCENCE DETECTOR SAMPLE ENCLOSURE

(71) Applicant: Randox Laboratories Ltd, Antrim (GB)

(72) Inventors: Marc Wharry, Antrim (GB); P. Evans, Antrim (GB); Stuart Jackson, Antrim (GB)

(73) Assignee: RANDOX LABORATORIES LTD., Northern Ireland (GB)

(*) Notice: Subject to any disclaimer, the term of this patent is extended or adjusted under 35 U.S.C. 154(b) by 400 days.

(21) Appl. No.: 16/632,270

(22) PCT Filed: Jul. 18, 2018

(86) PCT No.: PCT/GB2018/052031
§ 371 (c)(1),
(2) Date: Jan. 17, 2020

(87) PCT Pub. No.: WO2019/016546
PCT Pub. Date: Jan. 24, 2019

(65) Prior Publication Data
US 2020/0166465 A1    May 28, 2020

(30) Foreign Application Priority Data

Jul. 18, 2017 (GB) .................................. 1711504
Jul. 18, 2017 (GB) .................................. 1711556

(51) Int. Cl.
*B01L 3/00* (2006.01)
*G01N 21/76* (2006.01)

(52) U.S. Cl.
CPC .......... *G01N 21/76* (2013.01); *B01L 3/50855* (2013.01); *B01L 2200/02* (2013.01); *B01L 2200/0689* (2013.01)

(58) Field of Classification Search
CPC ............. B01L 3/50855; B01L 2200/02; B01L 2200/0689
USPC ......................................... 422/551–554, 568
See application file for complete search history.

(56) References Cited

U.S. PATENT DOCUMENTS

| 4,349,510 | A | 9/1982 | Kolehmainen et al. |
| 6,455,007 | B1* | 9/2002 | Mansky ............... G01N 33/367 436/178 |
| 6,649,128 | B1* | 11/2003 | Meyer .................. G01N 35/028 422/50 |
| 2013/0295575 | A1 | 11/2013 | Day et al. |

FOREIGN PATENT DOCUMENTS

| DE | 19840055 A1 | 3/2000 |
| EP | 0760478 A2 | 3/1997 |
| EP | 1279948 A1 | 2/2003 |
| JP | H05281143 A | 10/1993 |
| JP | H05157699 A | 12/2000 |
| WO | 93/22657 | 11/1993 |
| WO | 2005/106500 A1 | 11/2005 |

OTHER PUBLICATIONS

Goodman, Marco, International Search Report, European Patent Office, PCT/GB2018/052031, dated Sep. 21, 2018.
Goodman, Marco, Written Opinion of the ISA, European Patent Office, PCT/GB2018/052031, dated Sep. 21, 2018.

* cited by examiner

*Primary Examiner* — Natalia Levkovich
(74) *Attorney, Agent, or Firm* — Gavrilovich, Dodd & Lindsey LLP (57) ABSTRACT

There is provided a chemiluminescence detector sample enclosure. The enclosure comprises a first interface member forming part of a chemiluminescence detector and having a first sealing element and a second interface member comprising a plurality of sample holders, each sample holder having a second sealing element. The first interface member is engagable with and moveable between sample holder subsets of the plurality of sample holders, engagement with a respective sample holder subset providing engagement of the first interface member with each sample holder of the respective sample holder subset and relative movement of the first and second interface members providing movement between sample holder subsets; and when the first interface member is engaged with each respective sample holder, the first sealing element and the respective second sealing element are adapted to interact so as to form a light restricting seal between the first interface member and said sample holder.

11 Claims, 5 Drawing Sheets

CHEMILUMINESCENCE DETECTOR SAMPLE ENCLOSURE

CROSS REFERENCE TO RELATED APPLICATIONS

This application is a U.S. National Stage Application filed under 35 U.S.C. § 371 and claims priority to International Application No. PCT/GB2018/052031, filed Jul. 18, 2018, which application claims priority to Great Britain Application Nos. 1711504.9, filed Jul. 18, 2017 and 1711556.9, filed Jul. 18, 2017, the disclosures of which are incorporated herein by reference.

FIELD OF THE INVENTION

The present invention relates to an enclosure used in chemiluminescence detection and restriction of light ingress at an interface between a sample holder and a detector.

BACKGROUND

There are many occasions where there is a desire to conduct analysis on a liquid sample, or the constituents of a liquid sample. This is achievable by measuring one or more properties of such an analyte, such as measuring a glucose concentration in a liquid sample.

For such analysis and testing to be industrially viable, measurements are commonly carried out on multiple analytes simultaneously. This is known as multianalyte analysis.

Usually, only a small quantity of each analyte is measured. This is because either it is desirable or only possible to analyse a small amount of each analyte, or many tests are to be carried out on a single analyte that is divided into a number of specimens to enable discrete testing to be applied to each specimen. This means that each analyte or specimen is commonly held on or within a sample in a sample holder.

Due to the quantity of each analyte used, each analyte or specimen is commonly placed in a "microarray", so called due to the regular pattern in which they are placed, the size of the array and the quantities of analyte or discrete specimens used. An example of a microarray is a biochip, on which many biochemical reactions can be conducted simultaneously. Additionally or alternatively, each specimen or analyte may be passed through a microfluidic circuit.

When highly sensitive measurements are to be taken, or particular constituents or properties are to be measured, analytes or specimens are reacted with one or more other substances that cause chemiluminescence in particular circumstances, such as when particular concentrations of a substance or particular constituents are present. The occurrence or absence of chemiluminescence then needs to be detected to ascertain whether the desired properties are present in an analyte.

Chemiluminescence usually only produces a small amount of light. This makes it difficult to detect under ordinary room lighting, meaning that a number of step are taken to allow suitable detection of chemiluminescence. As such, for multianalyte microarray analysis where there is the possibility of chemiluminescence, it is known to conduct the whole analysis process inside a container that restricts light ingress, and to use highly sensitive cameras to detect chemiluminescence. Such cameras have larger pixels than less sensitive cameras, have sensors that are actively cooled, are designed to show minimal dark current, have optimised quantum efficiency for the wavelength range of about 300 nanometres (nm) to about 600 nm, have high dynamic range and/or electronics that pertain to low read noise.

However, providing a suitable container is difficult, especially when multiple discrete microarrays are to be analysed. This is because the equipment needed to conduct the analysis takes up a large amount of space due to the need for components to move the microarrays between each stage of the analysis process and the components required to carry out steps in the analysis process, such as to add substances to each microarray. For example, though sizes vary, known chemiluminescence detectors typically have a footprint of about 400 millimetres (mm) by about 600 mm.

Maintaining sufficiently low light levels in such a large space is difficult to achieve, and usually requires the container to be sealed in some manner. This also means that once an analysis process has begun, it is impossible to add further analytes, which limits flexibility and turnover of analytes. There is therefore a desire to improve the ability to maintain low light levels and a desire to improve flexibility in the analysis process.

A known means of reducing the container size is to only maintain light level restrictions in one region. This is achieved by passing microarrays to be imaged into a container that restricts the ingress of light and detecting chemiluminescence within the container. However, the cameras are usually not able to image all the microarrays at once. This means that for all the microarrays to be imaged, the microarrays need to be moved into position or multiple cameras are needed. To achieve this, the microarrays need to be moveable along two axes, making the movement mechanism complex. This adds components that need to fit and operate within the light level restriction region, and using multiple cameras is impractical, expensive and further complicates the arrangement of the components within the light level restriction region.

As such, there is still a need to improve flexibility of multianalyte analysis whilst also providing suitable light ingress restrictions to allow detection chemiluminescence.

SUMMARY OF INVENTION

According to a first aspect, there is provided a chemiluminescence detector sample enclosure, comprising: a first interface member forming part of a chemiluminescence detector and having a first sealing element; and a second interface member comprising a plurality of sample holders, each sample holder having a second sealing element, wherein the first interface member is engagable with and moveable between sample holder subsets of the plurality of sample holders, engagement with a respective sample holder subset providing engagement of the first interface member with each sample holder of the respective sample holder subset and relative movement of the first and second interface members providing movement between sample holder subsets, and wherein when the first interface member is engaged with each respective sample holder, the first sealing element and the respective second sealing element are adapted to interact so as to form a light restricting seal between the first interface member and said sample holder.

This arrangement allows a temporary light restricting seal to be provided with each sample holder so that chemiluminescence detection is able to be carried out on each sample holder whilst limiting interference from light from an external source. This reduces the number of components required to allow chemiluminescence to be detected because no light restricting region containing all the sample holders and detection components simultaneously is required. This therefore also reduces systematic error contribution to errors in results caused by other components. A further advantage of the enclosure is that presentation of a sample holder to the detector is simplified over previous systems because there is direct engagement of the sample holder and detector. This reduces the volume required for chemiluminescence detection in the system as a whole either allowing the size of the system as a whole to be reduced or for more analysis equipment to fit in the same size system.

It is intended that the relative movement of the first interface member and the second interface member is automated.

One or both of the first interface member or the second interface member may be moveable. The sample enclosure may be moveable between a first position in which there is a gap between first and second interface members and a second position in which the first interface member is engaged with at least one sample holder. At least one of the first and second interface members may be moveable along a first path connecting each of the sample holders to at least one other sample holder so as to allow the first interface member to move between sample holders. Additionally or alternatively at least one of the first and second interface members may be moveable along a second path, the second path connecting the first and second interface members so as to allow the sample interface to transition from the first to the second position.

Typically, the enclosure further comprises a moveable platform on which the first interface member is located. This allows the first interface member to be moveable. This keeps the space required for chemiluminescence detection to be carried out on all of the sample holders to be kept to a minimum because the motion envelope of the first interface member is smaller than the motion envelope of the second interface member would be if the second interface member were moveable in the same manner. Although more space is required for the second interface member to be moveable, there are other advantages to the second interface member being moveable. Accordingly, when the second interface member is moveable, the second interface member is located on the moveable platform instead of the first interface member.

The moveable platform may be moveable in any manner suitable for allowing engagement between the first and second interface members. Typically, the moveable platform is adapted to provide independent movement of the first interface member in at least two axes. By "independent movement" we intend to mean that movement along one axis is possible without movement also occurring along one or more further axes. This allows a simple movement mechanism that is accordingly easier to service, maintain and manufacture.

Movement of the moveable platform may be achieved using any suitable mechanism. Typically, the moveable platform has a first linear actuator configured to provide movement of the moveable platform along at least one axis of the at least two axes thereby providing movement of the first interface member along said at least one axis. We intend "at least one" to mean "only one" as well as "one or more".

The use of a linear actuator allows conventional electrical motors that produce circular motion to be usable due to the ability of the linear actuator to convert the circular motion into linear motion. This reduces the complexity of any driving mechanism. Of course, since the first interface member is located on the moveable platform, movement of the moveable platform along an axis causes movement of the first interface along that axis.

Any form of linear actuator may be used for the first linear actuator. Preferably, the first linear actuator may be a lead-screw actuator. This provides a simple mechanical linear actuator capable of producing repeatable motion.

Movement of the first interface member along the further axis may be achieved using any suitable mechanism. Typically, the moveable platform has a second linear actuator configured to provided movement of the first interface member in at least one axis of the at least two axes. The use of the second linear actuator is advantageous for the same reasons as the use of the first linear actuator is advantageous.

As with the first linear actuator, any form of linear actuator may be used for the second linear actuator. Preferably, the second linear actuator may be a rack and pinion. This provides a simple mechanical linear actuator capable of producing repeatable motion. When the second linear actuator is configured to provided movement along an axis along which gravity acts (or substantially along which gravity acts), there is a further advantage in that using a rack and pinion provides minimal wear on the moving parts due to the small size surface area of each contact surface relative to the size of the moving parts.

The first sealing element may be any device suitable for forming a light restricting seal with another body. Typically, the first sealing element is a gasket. Using a gasket means that the exact shape of the first interface member is able to vary slightly due to manufacturing tolerances.

As with the first sealing element, the second sealing element may be any device suitable for forming a light restricting seal with another body. Typically, the second sealing element comprises a plurality of concentric ridges. This allows the seal produced by the first and second sealing members to form a labyrinth through which any light must travel to cross the seal. This improves the light restricting ability of the seal.

Preferably, when the first interface member is engaged with each respective sample holder, the gasket may be configured to deform around each ridge of the concentric ridges of the second sealing element thereby providing complementary sealing elements forming a light restricting seal. This allows the seal to be effective whilst also allowing for variation between each second sealing element and each sample holder due to manufacturing tolerances.

The first interface member may be formed of any suitable material. Typically, the first interface member is formed of a material that is opaque to electromagnetic radiation in the wavelength region of 200 nanometres (nm) to 750 nm and absorbing of electromagnetic radiation in the wavelength region of 200 nanometres (nm) to 750 nm. This reduces any light passing through the material from which the first interface member is made.

Each sample holder subset may include any number of sample holders that is less than the total number of sample holders of the plurality of sample holder. Typically, each sample holder subset comprises at least one sample holder. This allows each sample holder subset to include one sample holder, or to include more than one sample holder. Preferably, each sample holder subset may comprise two sample holders, such as only two sample holders. This allows the size of the first sealing element to be relatively small. This in turn allows the size to be dictated by the detector and not the number of sample holders to which the first sealing element is able to be sealed at any one time.

BRIEF DESCRIPTION OF FIGURES

An example of a chemiluminescence detector sample enclosure is described in detail below, with reference to the accompanying figures, in which.

DETAILED DESCRIPTION

We now describe an example of a chemiluminescence detector sample enclosure including an example cartridge and movement mechanism. A process by which chemiluminescence is able to be detected is also described.

Figure 1:
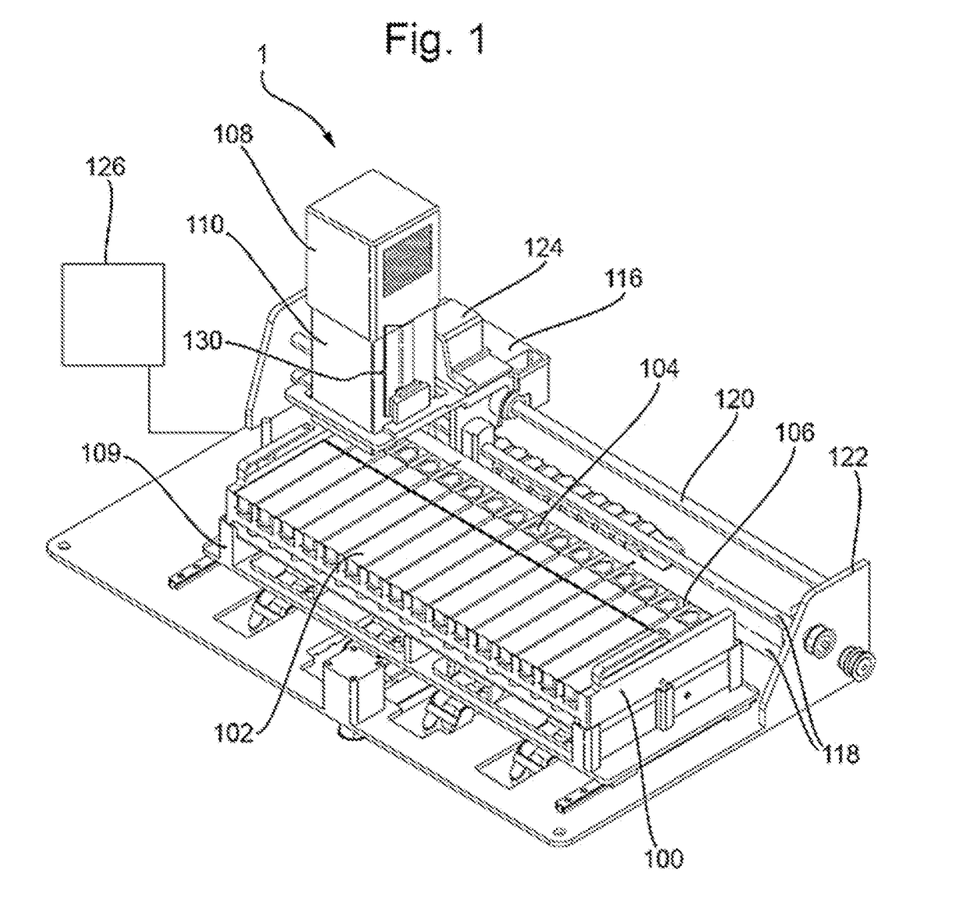
FIG. 1 shows a schematic view of an example enclosure.

Referring now to FIG. 1, a chemiluminescence detector sample enclosure is generally illustrated at 1. The enclosure forms part of an analyser (not shown) that is used to analyse a number of samples and carry out a number of test at the same time. Indeed, detection of chemiluminescence is only one step on the analysis that is carried out using the enclosure and its components.

The enclosure 1 has a rack 100 into which a plurality of cartridges 102 are secured. Each cartridge is clipped into the rack in order to hold it securely in the rack. The cartridges are positioned so that their length runs across the width of the rack with the cartridges arranged side by side so that they are adjacent each other.

Each cartridge 102 is a consumable item that it is intended is disposed of after a single use (by which we intend to mean after a single experimental or analysis run). Each cartridge has a number of liquid wells (not shown), and each of the liquid wells contains a liquid reagent in use. Each cartridge also has a sample well 104, which contains a biochip (not shown) and/or a microfluidic circuit (not shown). In this example, the sample well is located at an end of each cartridge with the liquid wells located along the length of each cartridge. The sample wells of the plurality of cartridges forming a set of sample wells.

The primary use of the cartridges is as a repository for a sample and liquid reagents to allow an assay to be carried out on the sample. In use, a sample is place in the sample well 104 of a cartridge 102. This is achieved by use of a pipette. Liquid reagent is then removed from a liquid well of the respective cartridge and placed in the sample well with the sample. This is carried out with each liquid reagent in turn according to a predetermined process. In some examples two or more liquid reagents are placed into the sample well with the sample at any one time.

In order to mix the sample with liquid reagents, agitation of the sample well can be needed. To apply agitation the rack 100 is moved sideways (by which we intend to mean the rack is moved in a direction approximately parallel to its width) in a back and forth manner by a small amount. In this example the range of movement of the rack is between about 2 centimetres (cm) and 10 cm. The movement is provided by an agitation mechanism 109 that moves rack in an oscillating manner to cause mixing.

The cartridges 102 are each formed of a plate 106 into which the respective liquid wells and sample well 104 are secured. The wells are each secured to the plate of each cartridge by a clip (not shown) that allows each respective well to be snapped into place. The wells are each a vessel with an opening at a rim at the upper end of the vessel. The clip holds the rim of each vessel against and in line with the plate of the cartridge. As an indication of the size of each sample well, in this example, the sample wells each have an area at their upper end of between about 1 square centimetre ($cm^2$) and about 4 $cm^2$.

As part of the assay, a test is run using liquid reagent to determine if one or more specific constituents are present in the sample. If the one or more constituents are present in the sample, chemiluminescence will occur. To ascertain if chemiluminescence occurs, the biochip or microfluidic circuit located in the sample well has to be imaged. This is achieved using a detector 108.

The detector 108 has a housing 110, within which is located a camera (not shown). Further details of the detector and how it functions may be found in International patent application PCT/GB2017/050088.

In this example, the detector is configured to be able to detect chemiluminescence from samples held in two adjacent sample wells 104, the two adjacent sample wells forming a subset of sample holders of the plurality of sample holders. This is achieved by the housing having two through bores 112 (shown in FIG. 3) forming apertures in a base 114 (also shown in FIG. 3) of the housing. The camera's field of view encompasses these apertures to allow light passing through the apertures to be detected by the cameras.

Since there are more cartridges 102 than sample wells which the detector 108 is able to be used to detect chemiluminescence from at any one time, either the rack needs to be moveable along an axis perpendicular to that in which it moves during agitation of the sample, or the detector needs to be moveable along that axis. In the example shown in FIG. 1, the detector is moveable along said axis.

This is achieved by the detector 108 being attached to a moveable platform 116. The moveable platform is connected to a pair of guide rails 118 and a threaded shaft 120. Each of the guide rails and threaded shaft are connected to brackets 122 at their ends that hold the rails in place parallel to each other.

The guide rails 118 are sufficiently smooth to allow the moveable platform to glide over them when moving. In order to move, the moveable platform has a motor 124 to which a thread (not shown) is attached. The thread is engaged with the threaded shaft 120. This forms a linear actuator (referred to as a first linear actuator) and allows rotation of the motor thread to move the moveable platform along the length of the threaded shaft, which defines a further axis along which the platform and detector is moveable.

In this example, the motor 124 is a stepper motor. This allows the distance travelled along the threaded shaft 120 on use of the motor to be known. This is achievable by counting the number steps taken by the motor, which is made possible by an encoder (not shown) in the stepper motor and knowing the travel distance along the threaded shaft of a single step of the motor.

The movement along the threaded shaft 120 is determined by a controller 126. This provides automated movement of the moveable platform that follows a predetermined process during an analysis run. The controller is connected to a number of sensors and to the control system running the whole analyser system so that the moveable platform 116 is moved at the appropriate time.

To make movement of the moveable platform 116 repeatable on start-up of the analyser and/or at the start of each analysis run, the moveable platform is moved along the threaded shaft 120 until it reaches a home sensor (not shown). This sets or resets the step counter to a zero value. During each analysis run, in this example, the moveable platform is only moved one direction away from the home sensor. Accordingly, the number of steps only increases. A limit switch (not shown) is located along the path of travel of the moveable platform at a suitable location to mark the end of the distance the moveable platform travels to carry out detection of any chemiluminescence from each sample well 104. When the moveable platform reaches the limit switch the moveable platform moves in the reverse direction to the direction travelled during an analysis run towards the home sensor and any neutral position in which it was located before reaching the home sensor.

While moving along the threaded shaft 120, the detector 108 is held in a position elevated above the cartridges 102. Accordingly the detector and the cartridges are separated with a gap therebetween. However, due to the intensity of the light produced from chemiluminescence, it is normally not practical to try to detect chemiluminescence with a gap between the detector and the cartridges. At least in part this is because ambient light interferes with the ability to detect chemiluminescence because of the increased noise produced in the image captured by the camera of the detector, and the ambient light may have a greater intensity than the chemiluminescence.

As such, in order for any chemiluminescence to be detectable by the detector 108 an environment needs to be produced that restricts light entry (also referred to as "ingress") into the environment other than through chemiluminescence. This environment is provided by the rack 100 being moved laterally, parallel to the length of the cartridges 102 mounted in the rack to bring them into alignment with the apertures in the base 114 of the detector housing 110. The detector 108 is then lowered until it makes contact with the respective cartridges in which the sample wells 104. An interface member 128 (shown in FIGS. 2 and 4 and forming a first interface member) is attached to the underside of the base 114. As is explained in more detail below, when the detector is lowered into contact with a pair of adjacent cartridges, the interface member forms a seal with the each of the cartridges that restricts entry of light through the seal (the cartridges thereby forming a second interface member). Once the seal is formed the enclosure is completed, which allows chemiluminescence to be detectable whilst minimising entry of light from other sources.

Once the seal is made, detection of any chemiluminescence is carried out, the detector is then raised out of contact with the cartridges and moved along the threaded shaft 120 to the next pair of cartridges that are to be analysed for any chemiluminescence. The cartridges are not moved at this stage, and are held in position until the end of the analysis run.

As set out above, the distance that the moveable platform is move along the threaded shaft 120 is known. As such, because the width of the cartridges is also known, the controller 126 knows how far to move the moveable platform along the threaded shaft between analysis being run on pairs of cartridges to detect any chemiluminescence.

The controller 126 controls the raising and lowering movement of the detector. This movement is automated in a similar manner to the movement of the moveable platform 116 along the threaded shaft 120. The movement is achievable due to a rack and pinion 130 attached to the moveable platform and the detector housing 110. This operates to raise and lower the housing and is orientated to produce movement along the same axis as gravity acts.

The ability of the detector 108 to be raised and lowered and moved along the threaded shaft 120, and the ability of the rack 100 to which the cartridges 102 are secured to be moved laterally provides movement along three axes with each axis being perpendicular to each of the other two axes. The controller 126 also controls the movement of the rack.

In an alternative example, instead of the detector being moveable along a threaded shaft, the detector is held in a fixed position and is only able to be raised and lowered. Instead of the detector being moveable in a second axis, the cartridges are moveable along a conveyor system to bring them into alignment with the interface member of the detector.

Figure 2:
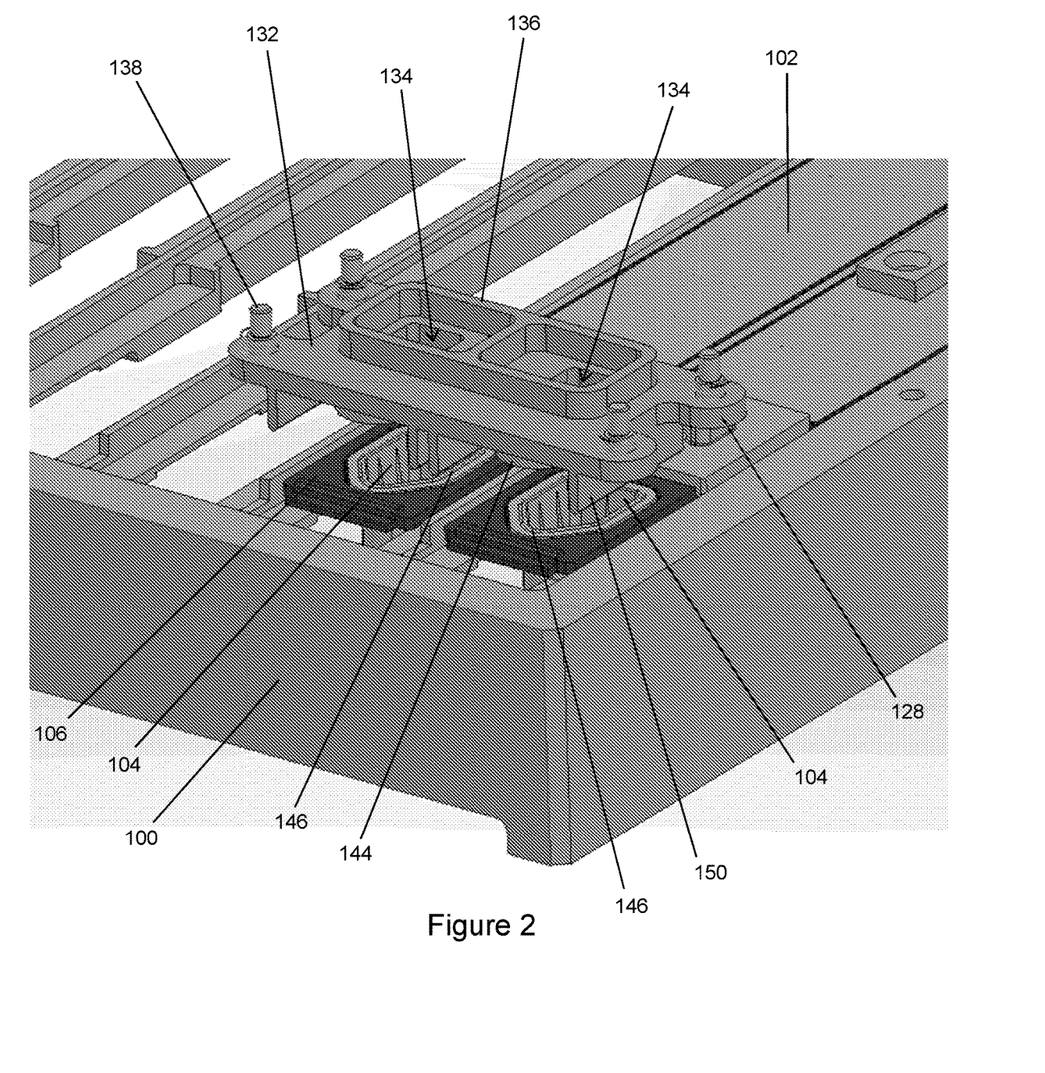
FIG. 2 shows a schematic view of example first and second interface members of an example enclosure.

Returning to the example shown in FIG. 1, FIG. 2 shows the interface member 128 and the ends of two cartridges 102 with which the interface member is aligned and which each have a sample well 104. The interface member has a central plate 132. The central plate has upper and lower surfaces and two through bores 134 providing apertures in the central plate between the upper and lower surfaces.

The through bores 134 in the central plate 132 of the interface member 128 are surrounded by an upstanding wall 136 on the upper surface of the central plate. The upstanding wall also passes between the through bores providing a barrier around each through bore. This means the upstanding wall has an approximate figure of eight shape.

The through bores 134 of the interface member 128 are separated so that they have the same separation as two sample wells in the adjacent cartridges. As mentioned above, and as shown in FIG. 3, the base 114 of the detector housing 110 also has through bores 112. These through bores are aligned with the through bores of the interface member.

When assembled, the interface member 128 is attached to the base 114 of the detector housing 110 by screws 138 (shown in FIG. 2). The screws attach to threaded bores 142 in the lower surface of the base.

Figure 3:
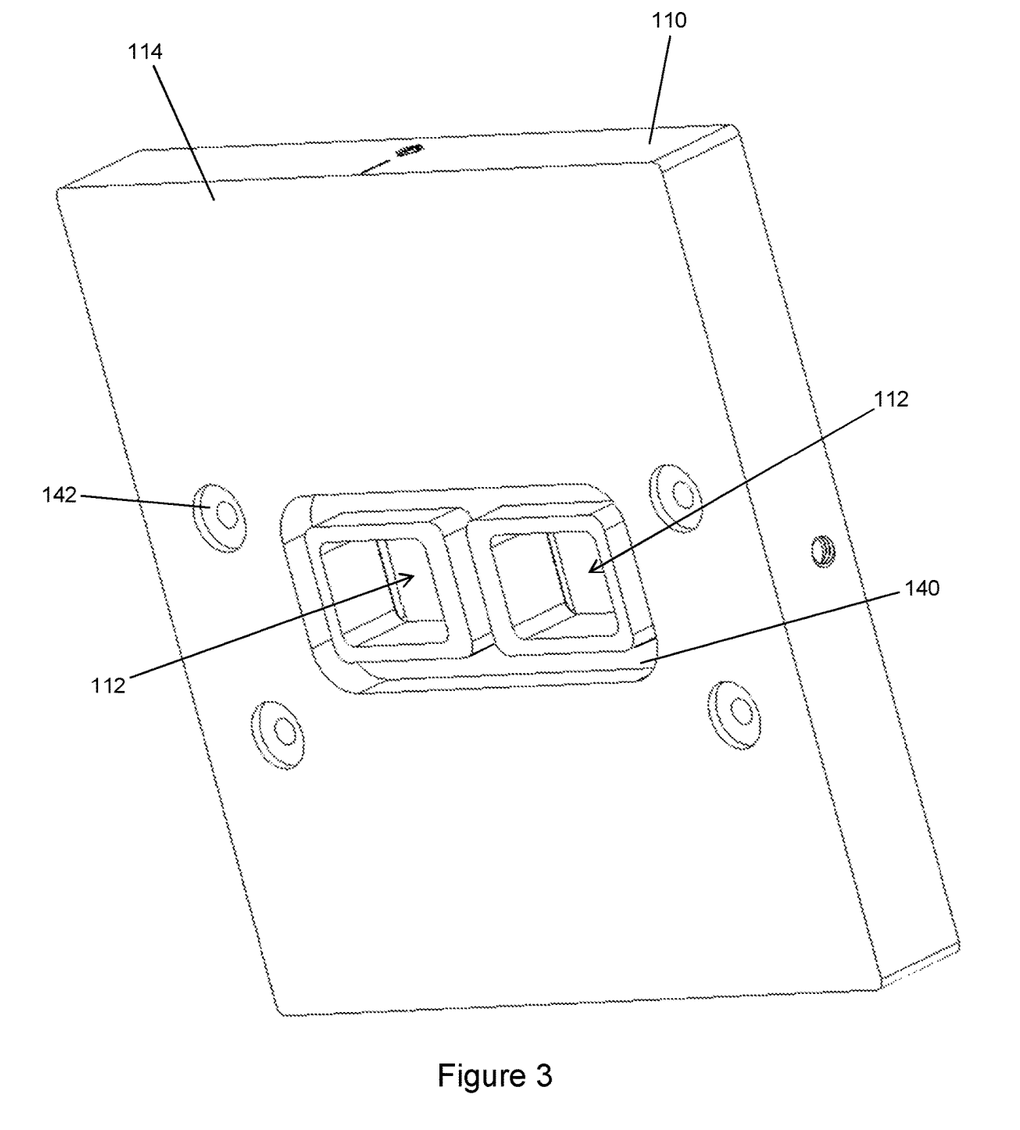
FIG. 3 shows a schematic view of an example detector portion.

As shown in FIG. 3, the base has a recess 140 around the through bores 112 in the base. The recess and the upstanding wall 136 are complementary shapes so that when the interface member is attached to the base the upstanding wall fits in the recess. This complementary fit provides a joint between the interface member and the detector housing that restricts light passage across the joint to restrict light entry into the through bores. This is because the joint forms a type of light tight labyrinth due to the changing direction and orientation of the path through the joint along the contact surfaces of the joint.

Figure 4A:
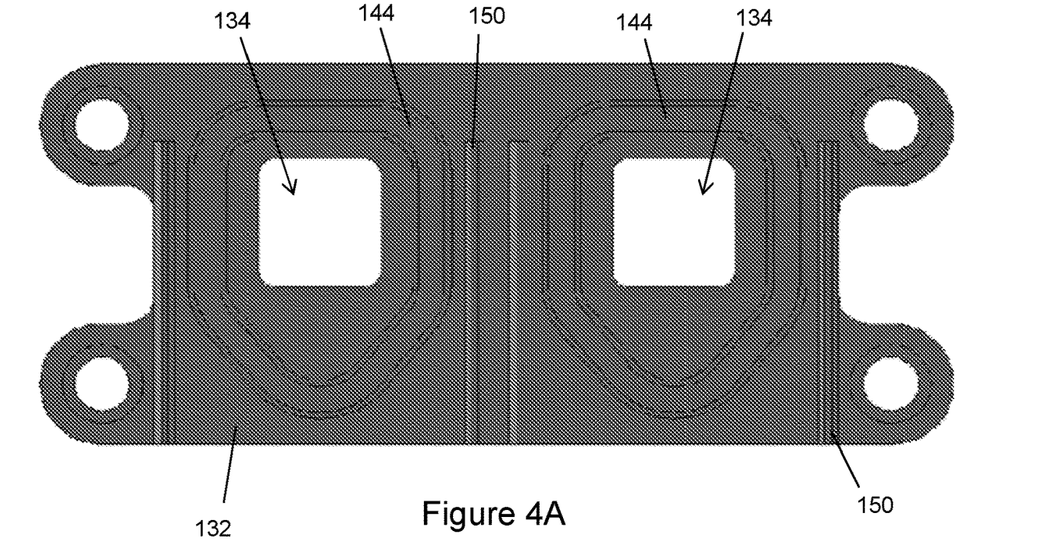
FIGS. 4A and 4B show schematic views of an underside of an example first interface member.
Figure 4B:
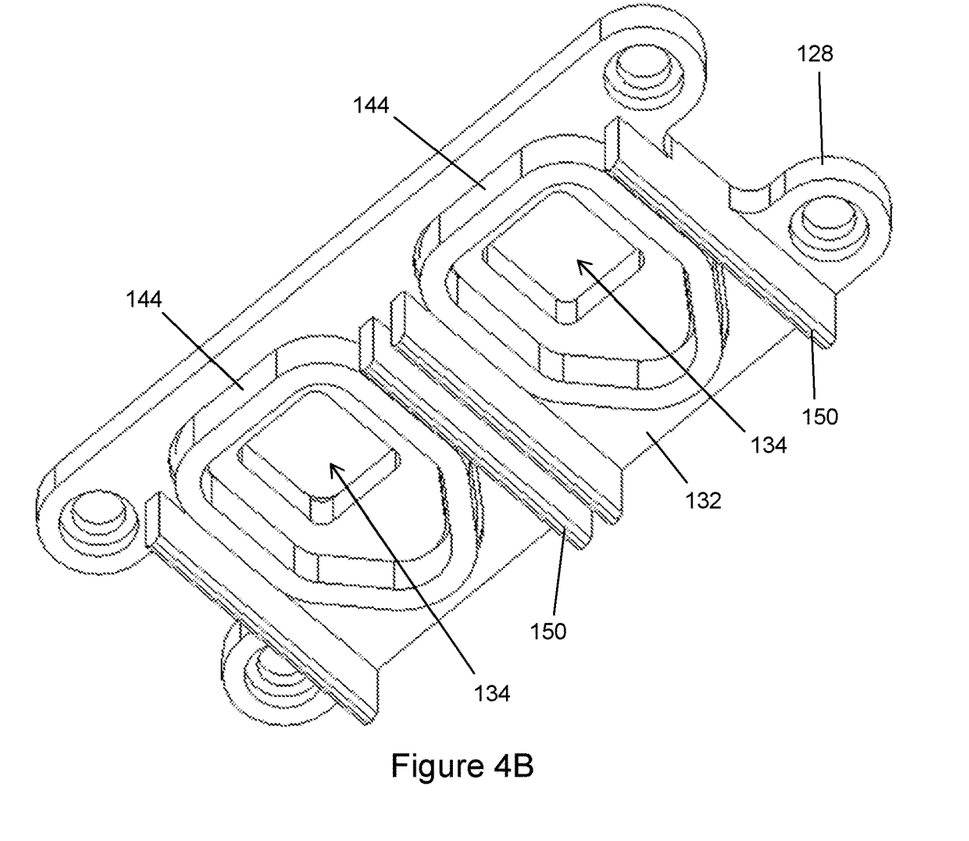

The features on the lower surface of the central plate 132 of the interface member 128 are most visible in FIGS. 4A and 4B. The lower surface has a sealing member 144, forming a first sealing element, encircling each through bore 134. The sealing members are glued to the lower surface of the central plate in this example, and are deformable. The sealing members may be formed of a rigid opaque peak with a flexible nitrile rubber layer (144) at the end sealing to polypropylene of the biochip well/cartridge. The deformable nature of each sealing member allows each sealing member to form a gasket.

The sealing members 144 are shaped to match the shape of the rim of the sample wells 104. Due to the position and shape of the sealing members, when the detector is lowered into contact with the cartridges, each sealing member makes contact with a rim of a respective sample well 104. As shown in FIG. 2, the sample wells have a ring 146 around the upper surface of their rim. This ring is formed of a plurality of concentric ridges 148 (shown in FIG. 5).

Figure 5A:
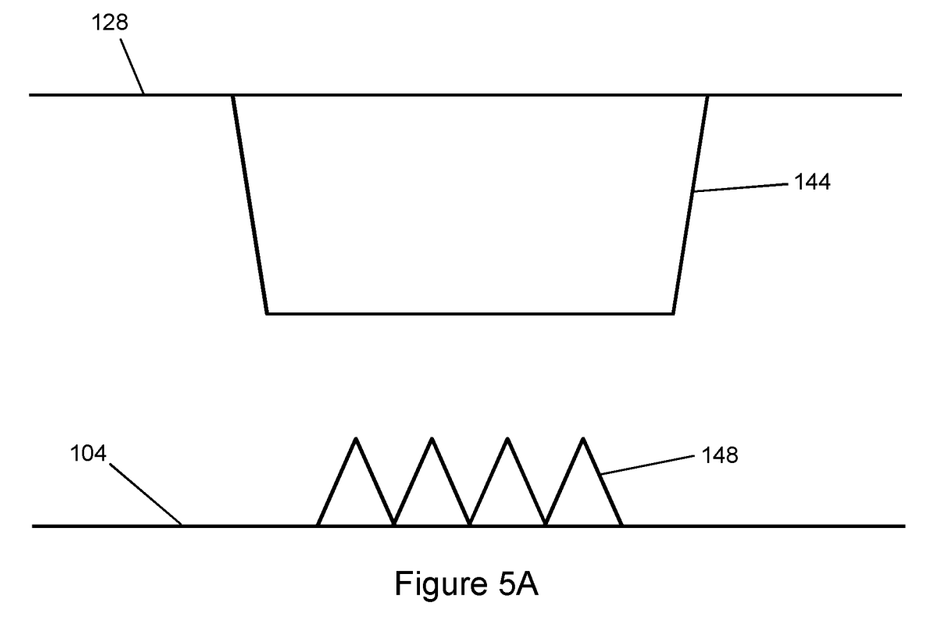
FIGS. 5A and 5B show cross sectional views of example first and second sealing elements.
Figure 5B:
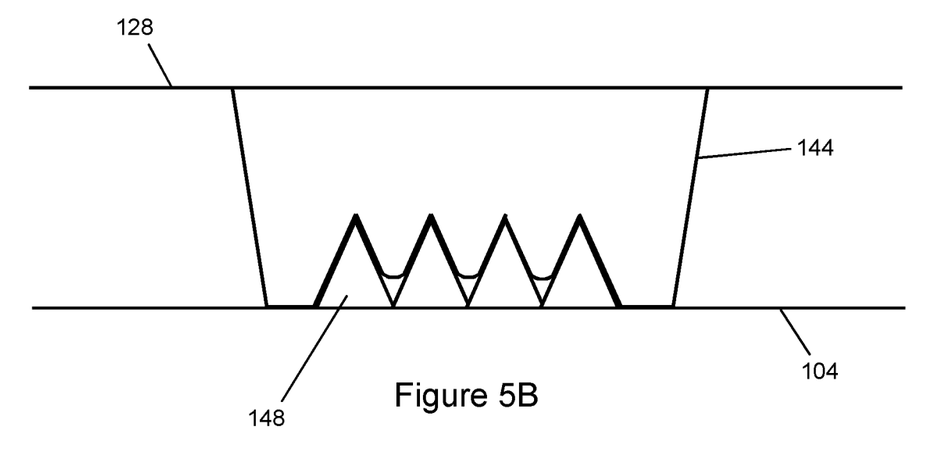

In this manner ring 146 on each sample well 104 forms a second sealing member that interacts with a respective sealing member 144, also referred to as a second sealing element, of the of the first interface member 128 to form a light restricting seal when the detector 108 is lowered into contact with the cartridges 102. As shown in FIG. 5A, when the detector and the cartridges are separated, there is a gap between the concentric ridges 148 on the sample well and the sealing member on the interface member. FIG. 5B shows the interaction between the sealing member and the concentric ridges when the detector is in contact with the cartridges. This shows the sealing member deformed around the concentric ridges. This forms a further light tight labyrinth thereby forming a light restricting seal that restricts light entry between the detector and cartridge when the detector and cartridge are in contact. As such, the plurality of cartridges form a second interface member of the enclosure since they form part of the enclosure when the detector and the cartridges are in contact.

In this manner a path is provided between the biochip and/or microfluidic circuit in each sample well and the camera inside the detector along which light from any chemiluminescence is able to travel but from which light from other sources, including other biochips is restricted. This allows increased sensitivity to any chemiluminescence, reduces noise and improves reliability of analysis results. This also allows flexibility in the cartridges present in the rack for analysis since only a small number (in this example, two) cartridges are analysed at any one time allowing other cartridges to be omitted or replaced without causing disruption to analysis being carried out by the detector.

A further feature used to restrict light entry is the fins 150 formed on the lower surface of the central plate 132 of the interface member 128. These are located, shaped and orientated to fit against each side of each cartridge 102 when the cartridge and the detector 108 are in contact in order to restrict light from one sample passing to another sample well and causing errors in the analysis. During raising and lowering of the detector, the fins slide over the plate 106 of the respective cartridge.

By implementing the form of light restricting seal described above, the area in which light levels had to be controlled is able to be much smaller than previously. For example the detector has a footprint of about 10 cm$^2$ to 20 cm$^2$. By using the form of light restricting seal described above, the total volume of the dark region is less than it would be otherwise, which advantageously allows for a smaller overall detection module.

In order to avoid light passing though the detector itself, the detector housing 110 and the interface member 128 are made from material that is opaque and absorbing to electromagnetic radiation in the wavelength range of at least 200 nm to 750 nm.

The invention claimed is:

1. A chemiluminescence detector sample enclosure, comprising:
   a housing for a chemiluminescence detector having at least one through bore;
   a first interface member attached to the housing and having at least one through bore aligned with the at least one through bore of the housing and having a first sealing element around the at least one bore of the first interface member; and
   a plurality of sample wells, each sample well of the plurality of sample well having a second sealing element, wherein a subset of the plurality of sample wells is less than the total number of sample wells, wherein
   the first interface member configured to engage with the subset of the plurality of sample wells wherein the first interface member has an equal number of first sealing elements as the number of second sealing elements of the subset of the plurality of sample wells and then move from the subset of the plurality of sample wells to engage with another subset of the plurality of sample wells, and wherein
   when the first interface member is engaged with each respective subset of the plurality of sample wells, the first sealing element and the respective second sealing element directly contact to form a light restricting seal between the first interface member and said subset of sample wells.

2. The enclosure according to claim 1, further comprising a moveable platform on which the first interface member is located.

3. The enclosure according to claim 2, wherein the moveable platform is adapted to provide independent movement of the first interface member in at least two axes by being moveable along each axis of the at least two axes without moving along one or more further axes of the at least two axes.

4. The enclosure according to claim 3, wherein the moveable platform has a first linear actuator configured to provide movement of the moveable platform along at least one axis of the at least two axes thereby providing movement of the first interface member along said at least one axis.

5. The enclosure according to claim 4, wherein the first linear actuator is a lead-screw actuator.

6. The enclosure according to claim 3, wherein the moveable platform has a second linear actuator configured to provided movement of the first interface member in at least one axis of the at least two axes.

7. The enclosure according to claim 1, wherein the first sealing element is a gasket.

8. The enclosure according to claim 1, wherein the second sealing element comprises a plurality of concentric ridges.

9. The enclosure according to claim 7, wherein when the first interface member is engaged with each respective sample well, the gasket is configured to deform around each ridge of the plurality of concentric ridges of the second sealing element when the first sealing element and second sealing element are in contact and interact, thereby providing complementary sealing elements forming a light restricting seal.

10. The enclosure according to claim 1, wherein the first interface member is formed of a material that is opaque to and absorbing of electromagnetic radiation in the wavelength region of 200 nanometres (nm) to 750 nm.

11. The enclosure according to claim 1, wherein each subset of sample wells comprises at least one sample well.

* * * * *